UNITED STATES PATENT OFFICE.

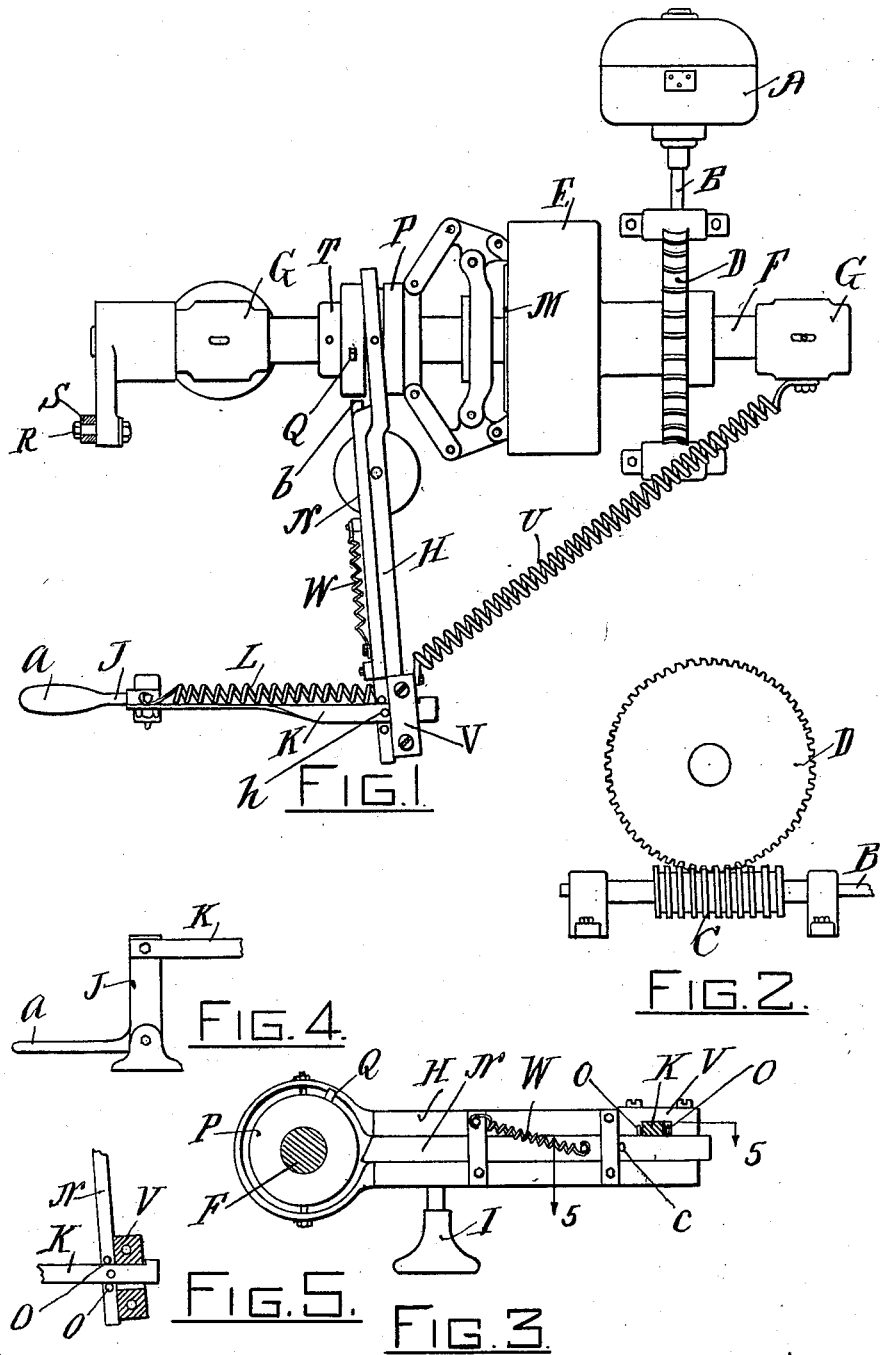

CHARLES E. SMITH, OF OAK LAWN, RHODE ISLAND.

CLUTCH MECHANISM.

1,013,457. Specification of Letters Patent. Patented Jan. 2, 1912.

Application filed August 22, 1910. Serial No. 578,467.

*To all whom it may concern:*

Be it known that I, CHARLES E. SMITH, a citizen of the United States, residing at Oak Lawn, in the county of Providence, in the State of Rhode Island, have invented a new and useful Improvement in Clutch Mechanisms, of which the following is a specification.

My invention consists in an improved clutch mechanism adapted for driving the machines employed for the manufacture of package rolls of gold leaf, and other machines where it is required to stop the machine at any desired portion of its revolution at the will of the operator, and at the same time, stop the machine automatically, when its operative revolution has been completed.

In the accompanying drawings: Figure 1 represents the plan view of a clutch mechanism embodying my improvement. Fig. 2 represents a side view of the worm and worm gear for driving the clutch shaft. Fig. 3 represents a side view of the shipper lever for the clutch. Fig. 4 represents a side view of the pedal for operating the hook for the shipper lever. Fig. 5 represents a detail section taken in the line 5, 5, of Fig. 3.

In the drawing, A represents an electric engine which provides the driving power, the shaft B of the engine being provided with the worm C, which engages with the teeth of a gear D secured to the hub of the clutch pulley E, which is loose upon the shaft F, which shaft is supported in the bearing boxes G, G. The friction clutch mechanism, is operated for engagement by means of the shipper lever H, which is pivotally held upon the standard I, and actuated for disengagement at the option of the operator by means of the pedal lever J, to which the hook K is jointed. The hook K is provided with a stop pin $h$, which is held up against the side of the shipper lever H by means of the spring L, which extends between the side of the shipper lever H and the upper end of the pedal lever J, and when the said hook K is drawn back by the downward movement of the pedal A, of the lever J, the outer end of the shipper lever H will be carried therewith, causing the engagement of the sliding clutch member M with the stationary clutch member of the pulley E. The shipper lever H is actuated for the disengagement of the clutch by means of the spring U, and is provided with a spring actuated slide N, having at its upper edge the pins O, O, which lie at opposite sides of the hook K.

The sliding sleeve P, of the clutch mechanism, is provided with a projecting pin or stud Q, which at one complete revolution of the shaft F, strikes the beveled end $b$, of the slide N, thus causing the backward movement of the said slide against the action of the spring W, and the disengagement of the outer end of the shipper lever H from the hook K, whereupon the spring U, will cause the disengagement of the clutch mechanism and the consequent stopping of any machine to which this clutch mechanism is applied, the stopping of the machine at any other desired time being under the control of the operator by means of the pedal lever J. The slide N is provided with a stop pin $c$ which serves to limit its forward movement under the action of the spring W. The outer end of the shaft F is provided with the crank pin R, and connecting rod S, shown in section in Fig. 1, whereby the rotary motion of the shaft F may be changed into a reciprocating motion for the transmission of energy. The backward movement of the sliding sleeve P, is limited by means of the fixed collar T, upon the shaft F. The hook K engages with the outer corner of the cap V, as shown in Fig. 5, the optional engagement of the members of the clutch being effected by pressing down with the foot on the pedal $a$, and their disengagement by raising the foot and allowing the spring U to act.

I claim as my invention:—

1. In a clutch mechanism the combination of the stationary clutch member and the sliding clutch member, with a spring actuated shipper lever, a latch engaging with the shipper lever to carry the sliding clutch member into engagement, a tripper slide carried by the shipper lever, a projecting stud moving with the rotation of the shaft of the clutch, and engaging with the tripper slide for automatically releasing the shipper lever from the latch and a spring for causing the automatic disengagement of the clutch members upon the disengagement of the latch.

2. In a clutch mechanism, adapted for both optional and automatic disengagement, the combination of the stationary clutch member, and the sliding clutch member, with a spring-actuated shipper lever, a latch engaging with the shipper lever and serving to hold the clutch members in engagement, means for automatically disengaging the latch to cause the separation of the clutch members, and means under the control of the operator, so connected with the sliding clutch member, as to cause the disengagement of the same from the opposite clutch member, without requiring the disengagement of the latch from the shipper lever.

3. In a clutch mechanism adapted for both optional and automatic disengagement, the combination of the stationary clutch member, and the sliding clutch member, a spring for forcibly withdrawing the sliding clutch member from its engagement, and means under the control of the operator for optionally forcing the sliding clutch member into engagement, in opposition to the disengaging action of the spring, and means for causing the predetermined disengagement of the sliding clutch member independently of the operator.

CHARLES E. SMITH.

Witnesses:
 BENJAMIN L. DENNIS,
 SOCRATES SCHOLFIELD.

Copies of this patent may be obtained for five cents each, by addressing the "Commissioner of Patents, Washington, D. C."